United States Patent
Klein

(10) Patent No.: US 11,836,278 B2
(45) Date of Patent: Dec. 5, 2023

(54) FAULT INJECTION EVENT DETECTION AT A CHIP AND RELATED SYSTEMS, METHOD AND DEVICES

(71) Applicant: Microchip Technology Incorporated, Chandler, AZ (US)

(72) Inventor: Michael Klein, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/303,326

(22) Filed: May 26, 2021

(65) Prior Publication Data

US 2021/0374291 A1    Dec. 2, 2021

Related U.S. Application Data

(60) Provisional application No. 62/704,894, filed on Jun. 2, 2020.

(51) Int. Cl.
*G06F 21/75*    (2013.01)
*H01L 23/00*   (2006.01)
*H03K 3/356*   (2006.01)

(52) U.S. Cl.
CPC ............ *G06F 21/75* (2013.01); *H01L 23/576* (2013.01); *H03K 3/356104* (2013.01)

(58) Field of Classification Search
CPC .. G06F 21/75; H01L 23/576; H03K 3/356104
See application file for complete search history.

(56) References Cited

U.S. PATENT DOCUMENTS

| 10,013,581 | B2* | 7/2018 | Hershman | G06F 21/75 |
| 10,134,744 | B1* | 11/2018 | Chen | H01L 27/1104 |
| 11,366,899 | B2* | 6/2022 | Kirschner | G06F 21/577 |
| 2009/0315603 | A1* | 12/2009 | Bancel | G06F 21/755 |
| | | | | 327/202 |
| 2011/0234307 | A1* | 9/2011 | Marinet | G06F 21/72 |
| | | | | 327/538 |

(Continued)

FOREIGN PATENT DOCUMENTS

EP    3595174 A2    1/2020

OTHER PUBLICATIONS

R. P. Bastos, J.-M. Dutertre and F. S. Torres, "Comparison of bulk built-in current sensors in terms of transient-fault detection sensitivity," 2014 5th European Workshop on CMOS Variability (VARI), 2014, pp. 1-6, doi: 10.1109/VARI.2014.6957089. (Year: 2014).*

(Continued)

*Primary Examiner* — Aravind K Moorthy
*Assistant Examiner* — Devin E Almeida
(74) *Attorney, Agent, or Firm* — TraskBritt

(57) ABSTRACT

Disclosed is a fault event detector configured to detect a fault injection event in an area of a chip that includes a vulnerable digital circuit. Such a fault event detector may include a bistable device that changes state at least partially in response to a presence of a fault injection event in a surrounding area of the fault event detector. Such a fault event detector may be arranged relative to a vulnerable digital circuit such that the vulnerable digital circuit is substantially located within the surrounding area of the first fault event detector.

19 Claims, 7 Drawing Sheets

(56) References Cited

U.S. PATENT DOCUMENTS

2019/0393227 A1* 12/2019 Bell ...................... H01L 27/092
2021/0328761 A1* 10/2021 Guilley ............... G06F 11/1044
2021/0405100 A1* 12/2021 Champeix .......... G01R 29/0878

OTHER PUBLICATIONS

Maletsky, "Attack Methods to Steal Digital Secrets" Atmel 8949A White Paper, Jun. 2015, 8 pages.
International Search Report from International Application No. PCT/US2021/070610, dated Aug. 30, 2021, 5 pages.
International Written Opinion from International Application No. PCT/US2021/070610, dated Aug. 30, 2021, 9 pages.

* cited by examiner

US 11,836,278 B2

FAULT INJECTION EVENT DETECTION AT A CHIP AND RELATED SYSTEMS, METHOD AND DEVICES

CROSS REFERENCE TO RELATED MATTERS

This application claims the benefit under 35 U.S.C. § 119(e) of U.S. Provisional Patent Application Ser. No. 62/704,894, filed Jun. 2, 2021, the disclosure of which is hereby incorporated herein in its entirety by this reference.

FIELD

Examples discussed herein relate, generally, to fault injection event detection at a chip.

BACKGROUND

Fault injection techniques were developed to test electronic systems (hardware and software) and understand how they behave under stress. However, just as such techniques can be used legitimately to extract useful information about a system, fault injection techniques can be used illegitimately to extract secret information about a system. In the case of a so-called fault injection attack, an attacker induces a system to operate a specific way—typically by injecting faults over a number of iterations or injecting a specific fault—and then gains useful information (e.g., secret information) about the system by observing its operation after such an inducement.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
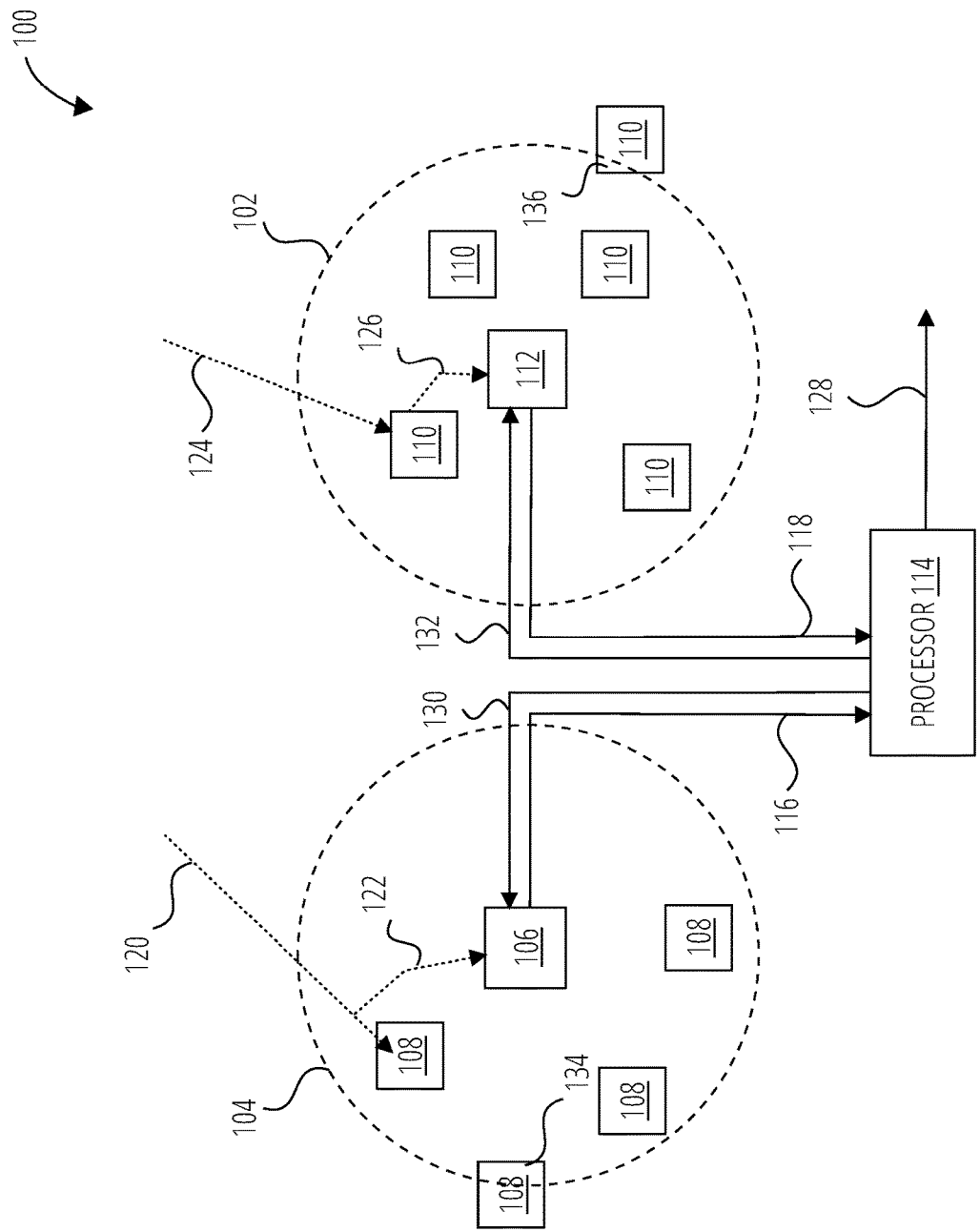
FIG. 1 is a schematic diagram depicting a chip portion including a fault event detector, in accordance with one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe illustrative examples of the present disclosure. In some instances similar structures or components may retain the same or similar numbering for the convenience of the reader; however, the similarity in numbering does not necessarily mean that the structures or components are identical in size, composition, configuration, or any other property.

It will be readily understood that the components of the examples as generally described herein and illustrated in the drawings may be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of examples or this disclosure to the specified components, steps, features, functions, or the like.

Thus, specific implementations shown and described are only non-limiting examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

Examples may be described herein in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indication followed by an alphabetic designator (e.g., 110A) or a numeric indication preceded by a "dash" (e.g., 110-1). For ease of following the description, for the most part element number indications begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, when an element is referred to as being "on," "connected to," "coupled to," or "coupled with" another element, it can be directly on, connected, or coupled with the other element or intervening elements may be present. In contrast, when an element is referred to as being "directly on," "directly connected to" or "directly coupled with" another element, there are no intervening elements or layers present. It will be understood that when an element is referred to as "connecting" or "coupling" a first element and a second element then it is connected to the first element and it is connected to the second element.

As used herein, when an element is referred to as being "electrically connected to" or "electrically coupled to" another element, then charge and/or signals can be transferred between the element and the other element, directly or via intervening elements if any are present. In contrast, when an element is referred to as being "directly electrically connected to" or "directly electrically coupled to" another element, there are no intervening elements or layers present. It will be understood that when an element is referred to as "electrically connecting" or "electrically coupling" a first element and a second element, then charge and/or signals can move between the first element and the second element via the element, including via intervening elements if any are present. It will be understood that the terms "electrically connected to," "electrically connecting," "electrically coupled to," and "electrically coupling," do not require actual charge or signals to be transferred.

A fault injection medium (e.g., laser, radiation, or temperature, without limitation) applied to an integrated circuit (IC, and also referred to herein as a "chip") may inject a fault (also referred to herein as a "fault injection") at the chip, including at a particular location or at a particular instance of time. For example, an attacker may attempt to inject a fault by scanning a focused laser beam across a die and shooting a laser burst at digital circuit of a chip. Such a laser burst may randomly or purposefully change a state (e.g., a logic state, without limitation) of a vulnerable digital circuit (e.g., one or more of flip-flops, latches, wires and registers, without limitation) while the digital circuit operates (e.g., executes commands and/or control sequences, without limitation). By way of non-limiting example, in a case of a digital circuit implemented with complimentary-metal-oxide semiconductor (CMOS) technology, a fault injection medium may turn ON or increase conduction by a parasitic device (such as a parasitic bipolar junction transistor (BJT) or parasitic diode, without limitation) of a CMOS structure at which the digital circuit is provided. A digital circuit experiencing a flow of a parasitic current may experience temporary or permeant state changes or changes in behavior, and even damage.

An attacker may attempt to observe changes in operation of the digital circuit (or the chip more generally) in response to an injected fault. As a non-limiting example, an attacker may observe differences in operation from the operation described in a written specification for a chip. Fault injection attacks can be utilized to extract secret information from chips such as from security chips performing cryptographic processes, or some operations thereof, and performing security protocols more generally.

Non-limiting examples of faults include entering false branches while executing code, changing data bits of a memory read, changing address bits, and changing a state of configuration bits and security bits. Non-limiting examples of secret information that these and other faults may expose include information about encryption keys, encryption protocols, key agreement protocols, passwords, addresses of sensitive information, timing information, and combinations and sub-combinations thereof.

An approach to address fault injection attacks known to the inventor of this disclosure is to duplicate vulnerable portions of a digital circuit and compare results from the duplicated digital circuit. If the results are different then a fault condition is detected. Examples of such an approach known to the inventor of this disclosure may more than double the die-size for vulnerable portions of the digital circuit and so are an expensive approach for detecting fault events. Another approach to address fault attacks known to the inventor of this disclosure is to include parity on memories, parity on instruction sets, and parity across operations. Examples of such an approach known to the inventor of this disclosure add complexity to design and increase die size, moreover, the inventor of this disclosure appreciates that such an approach may provide inconsistent detection across all fault conditions (in other words, reliable detection capability for only a limited set of fault events). Yet another approach to address fault injection attacks known to the inventor of this disclosure is to deploy analog detectors with vulnerable portions of a digital circuit. Example of such an analog detector known to the inventor of this disclosure may, disadvantageously, be individually discernable separate from the portions of the vulnerable digital circuit and so an attacker can avoid or suppress the analog detector when attempting to induce a fault.

As used herein, a "fault injection event" is any event that may (but not necessarily that will) inject a fault within a digital circuit of a chip. A fault injection event may be a specific attempt to inject a fault (i.e., a fault injection attack) or an event that may inject a fault but is not a specific attempt to inject a fault (e.g., caused by environmental conditions, without limitation).

As used herein, "vulnerable digital circuit" means a digital circuit of a chip that is susceptible to an injected fault.

As used herein, a "surrounding area" of a fault event detector is an area defined by a limit of the fault event detector to reliably respond to the presence of a fault injection event. The fault event detector will not reliably respond to the presence of a fault injection event outside the surrounding area.

The surrounding area of a fault event detector may be depicted herein as a substantially circular area with a fault event detector at the center, however, this disclosure is not limited to any specific shape of the surrounding area nor placement of a fault event detector at a geometric center of a shape. A surrounding area may correspond to at least a portion of a chip, and in some cases a surrounding area may extend to beyond a periphery of a chip.

In one or more examples, a digital circuit may be chosen for a fault event detector that exhibits at least a substantially same susceptibility to a fault injection medium (e.g., a laser, radiation, or applied temperature, without limitation) as a vulnerable digital circuit to be monitored by the fault event detector.

In one or more examples, a digital circuit, including a vulnerable digital circuit, and portions thereof, may include one or more digital logic blocks, and more specifically, physical layout elements (e.g., transistors, without limitation) that comprise the respective digital logic blocks. In various examples, a vulnerable digital circuit and an associated fault event detector may correspond to a standard cell for a digital logic block, or a portion thereof, which is a functional block defined using a cell-based methodology, such as a standard cell methodology used in semiconductor design.

In one or more examples, a digital circuit, portions thereof, and arrangements thereof may be chosen for a fault event detector at least partially based on a standard cell design for a digital logic block. In one or more examples, a digital circuit of a fault event detector may be modified from a digital circuit designed for implementing a standard cell design of a digital logic block such that a fault event detector resembles (e.g., to an attacker, without limitation) a standard cell, e.g., a transistor layout of a fault event detector resembles a transistor layout of digital logic of a standard cell, without limitation. Thus, in one or more examples, a fault detector may purposefully resemble a circuit of a standard cell. In one or more examples, a fault event detector may not purposefully resemble a circuit of a standard cell, for example, where a fault injection event is expected to be as a result of environmental conditions and not a specific attack, or features of the digital circuit of a fault event detector or a chip are obscured or otherwise not individually discernable.

In one or more examples, a number of fault event detectors may be located in a portion of a chip that includes a number of vulnerable digital circuits. Locations of the fault event detectors may be chosen such that respective vulnerable digital circuits are within a surrounding area of one or more of the fault event detectors. In one or more examples, a number of fault event detectors may be located in a portion of a chip that includes a vulnerable digital circuit and the respective locations of the fault event detectors may be chosen such that their respective surrounding areas overlap at a region of the chip including the vulnerable digital circuit.

FIG. 1 is a diagram depicting a chip portion 100 configured for fault event detection in accordance with one or more examples. Chip portion 100 includes first fault event detector 106, second fault event detector 112, and processor 114 electrically coupled to first fault event detector 106 and second fault event detector 112. A number of first vulnerable digital circuits 108 (e.g., one or more first vulnerable digital circuits 108, or at least a portion 134 of a first vulnerable digital circuit 108 as depicted by FIG. 1, without limitation) are located within first surrounding area 104 of first fault event detector 106, and a number of second vulnerable digital circuits 110 (e.g., one or more second vulnerable digital circuits 110, or at least a portion 136 of a second vulnerable digital circuit 110 as depicted by FIG. 1, without limitation) are located within second surrounding area 102 of second fault event detector 112.

First fault event detector 106 and second fault event detector 112 are configured to respond to fault events that occur in first surrounding area 104 and second surrounding area 102, respectively, by generating first fault event indication 116 and second fault event indication 118, respectively. In one or more examples, first fault event detector 106 may include a respective digital circuit that changes state in response to a presence of a first fault injection event 120 within first surrounding area 104, as discussed herein, and second fault event detector 112 may include a respective digital circuit that changes state in response to a presence of a second fault injection event 124 within second surrounding area 102, as discussed herein, and first fault event detector 106 and second fault event detector 112 may respond to the state change at the respective digital circuits by generating first fault event indication 116 and second fault event indication 118, respectively.

Notably, respective digital circuits of first vulnerable digital circuits 108 and second vulnerable digital circuits 110 may be of the same or different type, may change state in response to the presence of the same or different types of fault injection events, and may have the same or different degree of sensitivity to fault injection events.

In a contemplated operation of chip portion 100, when a first fault injection event 120 occurs at one of the first vulnerable digital circuits 108 located within first surrounding area 104 there is a corresponding first detected fault injection event 122 at first fault event detector 106 (e.g., a change in state of a digital circuit of first fault event detector 106, without limitation). First fault event detector 106 responds to first detected fault injection event 122 by generating first fault event indication 116, and sending first fault event indication 116 to processor 114. Similarly, when a second fault injection event 124 occurs at one of the second vulnerable digital circuits 110 located within second surrounding area 102, there is a corresponding second detected fault injection event 126 at second fault event detector 112 (e.g., a change in state of a digital circuit of second fault event detector 112, without limitation). Second fault event detector 112 responds to second detected fault injection event 126 by generating second fault event indication 118, and sending second fault event indication 118 to processor 114. In one or more examples, processor 114 may be configured to perform appropriate action 128 in response to first fault event indication 116 or second fault event indication 118, i.e., more generally in response to first detected fault injection event 122 or second detected fault injection event 126. By way of non-limiting examples, appropriate action 128 taken by processor 114 may include one or more of: re-perform one or more operations, lockdown a chip portion 100 or chip including the same, or trigger an alarm. Processor 114 may be configured to reset the first fault event detector 106 and second fault event detector 112 via first and second reset signals 130 and 132, as discussed herein.

In some cases, fault event detectors, including first fault event detector 106 or second fault event detector 112, may be arranged relative to vulnerable digital circuits or portions thereof at least partially based on an expected type of fault event. As a non-limiting example, given a type of fault injection event, one may expect a specific position of a source of such a fault injection event relative to the vulnerable digital circuits, or may expect a specific area of a chip to be affected by a fault injection event.

Figure 2A:
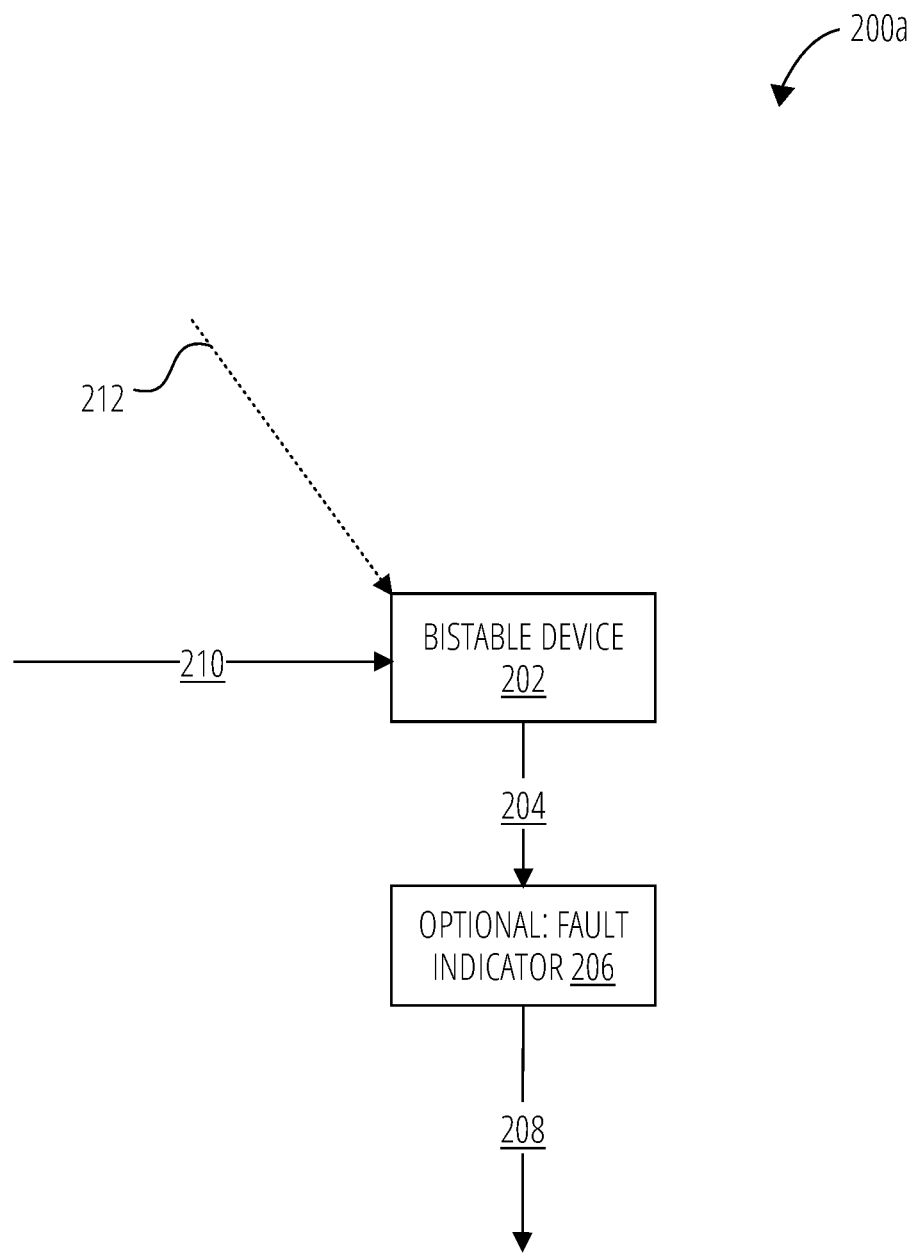
FIG. 2A is a block diagram depicting a fault event detector in accordance with one or more examples.

FIG. 2A is a block diagram depicting a fault event detector 200a in accordance with one or more examples. Fault event detector 200a is a non-limiting example of first or second fault event detector 106 or 112 of FIG. 1.

Fault event detector 200a is configured, generally, to generate a fault event indication 208 in response to a fault injection event 212. In one or more examples, fault event detector 200a may include a bistable device 202, and an optional fault indicator 206.

In one or more examples, bistable device 202 is a circuit or device that reliably exhibits two stable states. Non-limiting examples of a bistable device 202 include a CMOS latch, a CMOS flip-flop, or a CMOS inverter. A change from exhibiting a first state to exhibiting a second state is triggered at bistable device 202 in response to a fault injection event 212.

In one or more examples, an operational mode of fault event detector 200a changes in response to assertions and de-assertions of an optionally externally generated reset 210. In one or more examples, upon assertion of reset 210, fault event detector 200a may change to a reset mode of operation where a state of bistable device 202 is set, or optionally reset, to a known state, and fault event indication 208 is de-asserted. Upon, and during, assertion of reset 210, a state transition 204 of bistable device 202 remains de-asserted regardless of whether, or not, fault injection events, such as fault injection event 212, are present. While state transition 204 is de-asserted, fault event indication 208 is de-asserted and therefore indicative of "no fault injection event detected." In one or more examples, upon de-assertion of reset 210, fault event detector 200a may change to a normal mode of operation. Changing to the normal mode of operation does not change the state of bistable device 202, assert state transition 204, or assert fault event indication 208. Upon, and during, de-assertion of reset 210, state transition 204 is asserted in response to bistable device 202 changing from a first state to a second state in response to fault injection event 212. While state transition 204 is asserted, fault event indication 208 is asserted and indicative of "fault injection event detected." Additionally, or alternatively to an externally generated reset 210, in one or more examples, fault event detector 200a may include a high resistance path for conveying an internal reset 210, e.g., an internal signal generated in response to momentary events, without limitation.

One or more examples of a fault indicator 206 may include a circuit arranged to generate fault event indication 208 indicative of state transition 204 that is observed by fault indicator 206 at bistable device 202. Fault event indication 208 is a non-limiting example of a first fault event indication 116 and a second fault event indication 118. In the absence of optional fault event indicator 206, state transition 204 may be utilized as fault event indication 208.

Figure 2B:
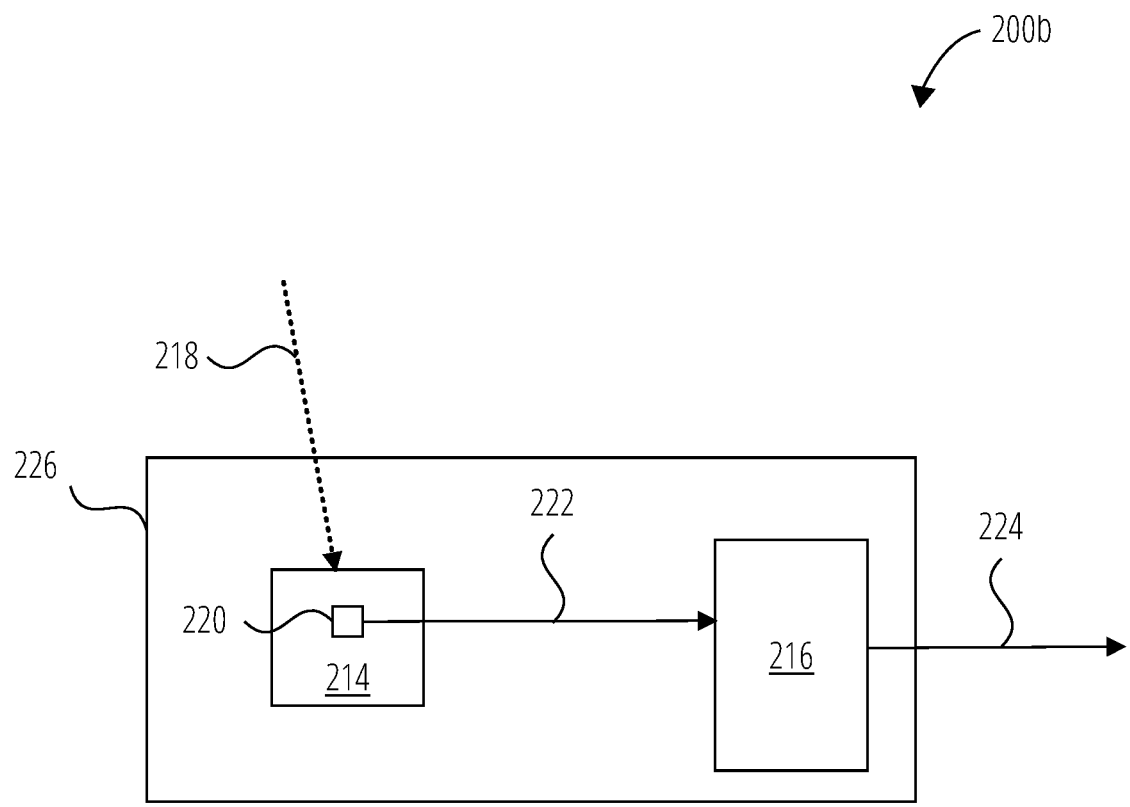
FIG. 2B is a block diagram depicting another fault event detector in accordance with one or more examples.

FIG. 2B is a block diagram depicting a fault event detector 200b configured to detect the presence of a fault injection event, in accordance with one or more examples. Fault event detector 200b is a non-limiting example of a first or a second fault event detector 106 or 112.

Fault event detector 200b includes a fault event sensor 226 configured, generally, to sense a signal that is indicative of the presence of a fault injection event. In one or more examples, fault event sensor 226 may include a sensing element 216 that is configured to sense an increasing amount of parasitic current 220 at CMOS structure 214 as a trigger 222. Parasitic current 220 exhibits a generally increasing magnitude in response to the presence of a fault injection event 218, and exhibits a generally stable or decreasing magnitude in the absence of a fault injection event 218.

Figure 3:
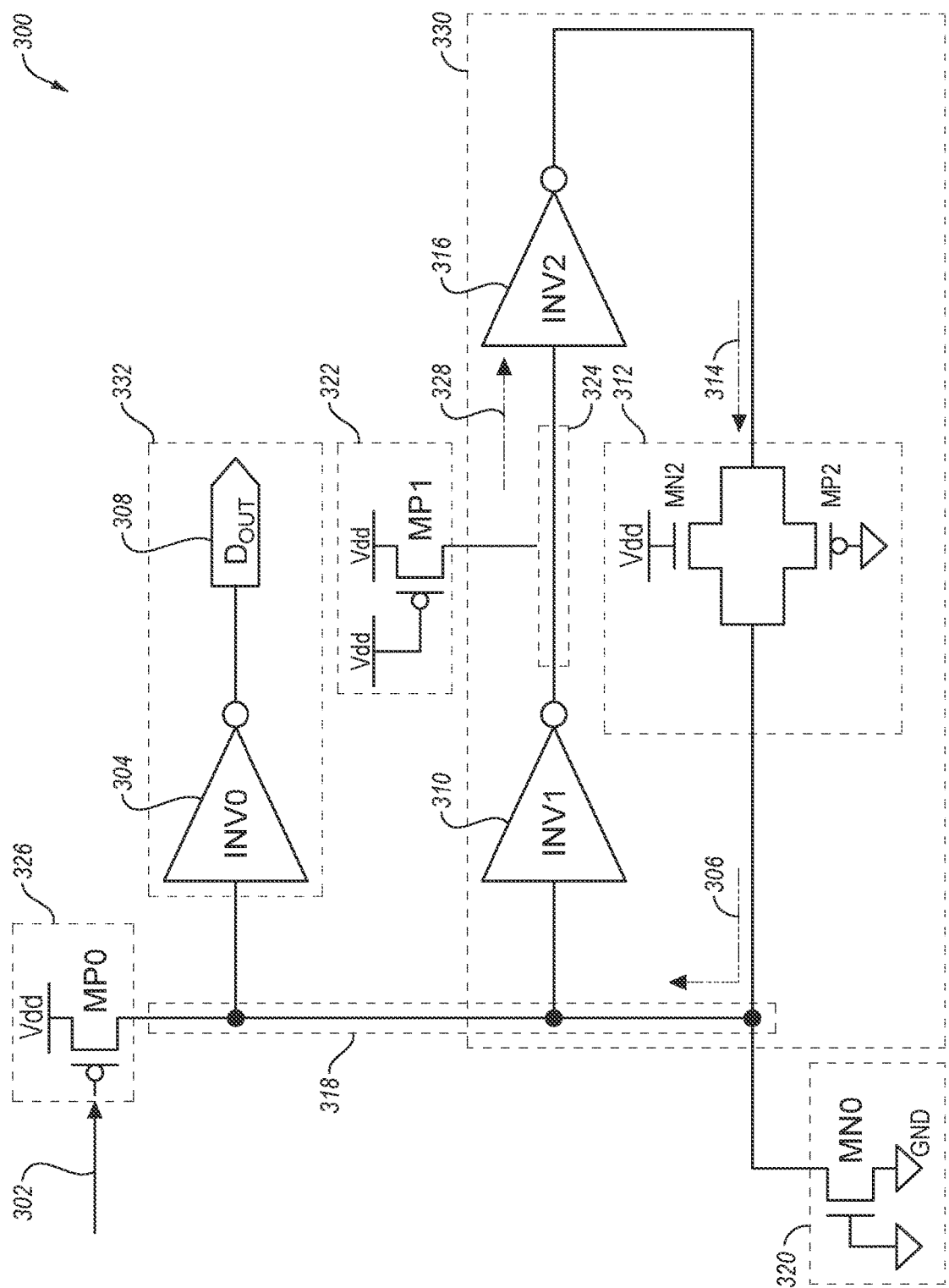
FIG. 3 is a schematic diagram depicting a digital circuit of a standard cell modified to be a fault event detection circuit, in accordance with one or more examples.

As a non-limiting example, a CMOS switch (not depicted by FIG. 2B) provided at CMOS structure 214 may be arranged to be always OFF (e.g., as depicted by FIG. 3, without limitation). As a non-limiting example, an NMOS switch having its terminals electrically coupled such that a voltage level at its source and gate terminals is always lower than a voltage level at its drain; or a PMOS switch having its terminals electrically coupled such that a voltage level at its drain and gate terminals is always higher than a voltage level at its source. Such a CMOS switch has a parasitic device, and more specifically, a reverse-biased parasitic diode present at CMOS structure 214 at which the CMOS switch is provided. As used herein, referring to a parasitic diode as "reverse-biased" means a voltage at the cathode of the parasitic diode is higher than a voltage at the anode of the parasitic diode. Applying fault injection event 218 to such a CMOS switch initiates or increase conduction by its parasitic diode and, accordingly, a magnitude of parasitic current (also referred to herein as a "leakage current"), such as parasitic current 220. Upon sensing an increasing parasitic current 220 or sufficient magnitude of parasitic current 220, trigger 222 is generated, and sensing element 216 exhibits a response 224.

In one or more examples, one or more of first and second fault event indications 116 and 118 may be response 224, or may be asserted at least partially responsive to response 224.

In one or more examples, bistable device 202 of fault event detector 200a (FIG. 2A) may include fault event sensor 226 or be coupled to fault event sensor 226, and a change from a first state to a second state by bistable device 202 may be triggered at least partially responsive to response 224 and state transition 204 asserted responsive thereto. In one or more examples, response 224 may force (which may be referred to herein as "triggering") a state change at bistable device 202 from a first state to a second state, thereby asserting state transition 204.

FIG. 3 is a circuit diagram depicting a fault event detection circuit 300, in accordance with one or more examples. Fault event detection circuit 300 is a non-limiting example of a fault event detector 200a of FIG. 2A where a state transition 204 at bistable device 202 is triggered by a fault event sensor 226 of FIG. 2B, or a non-limiting example of first and second fault event detectors 106 and 112 of FIG. 1.

In one or more examples, fault event detection circuit 300 is configured, generally, to assert a fault event indication signal 308 in response to a detected fault injection event, such as first detected fault injection event 122 or second detected fault injection event 126, without limitation.

In one or more examples, fault event detection circuit 300 may include bistable circuit 330, first fault event sensing circuit 320, second fault event sensing circuit 322, optional reset circuit 326, and an optional fault indicator circuit 332. In one or more examples, fault event indication signal 308 is a non-limiting example of a fault event indication 208, first fault event indication 116, or second fault event indication 118. In one or more examples, bistable circuit 330 is a non-limiting example of bistable device 202, fault indicator circuit 332 is a non-limiting example of fault indicator 206, and each of first fault event sensing circuit 320 and second fault event sensing circuit 322 are non-limiting examples of fault event sensor 226.

In the specific non-limiting example of fault event detection circuit 300 depicted by FIG. 3, reset circuit 326, first fault event sensing circuit 320, second fault event sensing circuit 322, and bistable circuit 330 utilize complimentary-metal-oxide semiconductor (CMOS) switches. Reset circuit 326 includes a PMOS switch (i.e., a P-channel type metal-oxide semiconductor switch) MP0 with its gate terminal electrically coupled to a reset signal 302, which is a non-limiting example of reset 210, and its source terminal electrically coupled to supply voltage Vdd. First fault event sensing circuit 320 includes an NMOS switch (i.e., an N-channel type metal-oxide semiconductor switch) MN0, and MN0's source and gate terminals are electrically coupled to ground voltage GND associated with a logic low. Second fault event sensing circuit 322 includes a PMOS switch MP1, with MP1's gate and source terminals electrically coupled to a supply voltage Vdd associated with a logic high. In one or more examples, voltages Vdd and GND may be associated with voltage rails of fault event detection circuit 300.

In one or more examples, bistable circuit 330 is a circuit configured, generally, to reliably exhibit one of two stable states. In one or more examples, bistable circuit 330 may be configured as a latch, a flip-flop or an inverter, without limitation. In the specific non-limiting example depicted by FIG. 3, bistable circuit 330 is configured as a latch, which is configured, generally, to keep a state of an internal signal corresponding to a state of a last signal provided to bistable circuit 330 by reset circuit 326, and more specifically, keeps first signal 306 at logic level high via a latching by first inverter 310, second inverter 316, and resistive circuit 312, without limitation.

A state of bistable circuit 330 is indicated by a state of an internal signal, first signal 306. Exhibiting a logic level, high or low, by first signal 306 indicates a state of bistable circuit 330 is a first or second state. This disclosure is not limited to utilization of voltage levels associated with voltage rails or logic levels to infer a state of bistable circuit 330 or a state of first signal 306.

First fault event sensing circuit 320 and second fault event sensing circuit 322 are arranged to trigger a state transition at bistable circuit 330 in response to a fault injection event, and more specifically, a state transition by first signal 306, as discussed below. In one or more examples, first fault event sensing circuit 320 and second fault event sensing circuit 322 are configured, generally, to reliably provide a trigger sufficient to force a state transition at bistable circuit 330 in response to a fault injection event.

During normal operation of fault event detection circuit 300 (i.e., where the circuit has been reset by reset signal 302, and is able to change a state of first signal 306 in the presence of a fault injection event, as discussed below), switches MN0 and MP1 of first and second fault event sensing circuits 320 and 322, respectively, are OFF, and first signal 306 exhibits a high logic level. If one or both of the respective parasitic devices (such as a parasitic bipolar junction transistor (BJT) or parasitic diode, without limitation) of NMOS switch MN0 of first fault event sensing circuit 320 conducts, or increases conductance, in response to a fault injection event and a sufficient magnitude of current flows, the NMOS switch MN0 will force first signal 306 to a low logic level and will force first node 318 to ground voltage GND, which will drive second node 324 to voltage Vdd by first inverter 310. If the respective parasitic devices (such as a parasitic bipolar junction transistor (BJT) or parasitic diode, without limitation) of PMOS switch MP1 of second fault event sensing circuit 322 conducts, or increases conductance, in response to a fault injection event and a sufficient magnitude of current flows, the PMOS switch MP1 will force second node 324 to a high logic level, i.e., will drive it towards Vdd, which will then be latched by bistable circuit 330, setting first signal 306 and first node 318 to a low logic level.

In either case, forcing first node 318 to GND, or to the low logic level, or second node 324 to Vdd, or a high logic level, results in a state transition at bistable circuit 330.

In one or more examples, the signal that fault event detection circuit 300 senses via at least one of first fault event sensing circuit 320 and second fault event sensing circuit 322 is the change in the magnitude of the parasitic currents at first fault event sensing circuit 320 and second fault event sensing circuit 322, which magnitude increases in the presence of a fault injection event. Triggering is the realization of sufficient parasitic current (also characterizable as a sufficient increase in magnitude of parasitic current) at switch MN0 or MP1 to force a state transition at bistable circuit 330. In the specific example depicted by FIG. 3, a parasitic current at second fault event sensing circuit 322 that is greater than a pull-down current at first inverter 310 will be sufficient to change the state of bistable circuit 330, and a parasitic current at first fault event sensing circuit 320 that is greater than a pull-up current at second inverter 316 will be sufficient to change a state of bistable circuit 330.

While in the specific example depicted by FIG. 3, first fault event sensing circuit 320 and second fault event sensing circuit 322 are depicting having a pull-down and a pull-up configuration at fault event detection circuit 300, respectively, utilization of other configurations does not exceed the scope of this disclosure.

In one or more examples, resistive circuit 312 is configured to assist reset circuit 326 or first fault event sensing circuit 320, as the case may be, change a state of first signal 306 and bistable circuit 330 more generally (e.g., logic low to logic high and vice versa, without limitation). Resistive circuit 312 is coupled between an output of second inverter 316 and first node 318, and includes a PMOS switch labeled MP2 and an NMOS switch labeled MN2. The gate terminals of the PMOS switch MP2 is electrically coupled to ground voltage GND and the gate terminal of the NMOS switch MN2 is electrically coupled to supply voltage Vdd, so both of switches MP2 and MN2 are arranged to be always ON. When both of switches MP2 and MN2 are ON, resistive circuit 312 provides a resistance between an output of second inverter 316 and reset circuit 326 and first fault event sensing circuit 320. Accordingly, resistive circuit 312 is arranged to limit a magnitude of an output current of second inverter 316 so that when reset circuit 326 or first fault event sensing circuit 320 attempts to force a change in a state of first signal 306 the influence of the output of second inverter 316 does not force a state of first signal 306, and bistable circuit 330 more generally, to its previous state before the state reinforcing arrangement of first inverter 310 and second inverter 316 can latch first signal 306 to the new state.

In one or more examples, fault event detection circuit 300 includes at least two operational modes: a normal operating mode where it can detect fault injection events and a reset mode where it does not detect fault injection events. Other operational modes do not exceed the scope of this disclosure. During a reset mode of operation, fault event detection circuit 300 is configured to continuously indicate "no fault injection event detected," irrespective of whether first fault event sensing circuit 320 or second fault event sensing circuit 322 are triggering. During a normal mode of operation, fault event detection circuit 300 is configured to indicate "fault injection event detected," responsive to either of first fault event sensing circuit 320 or second fault event sensing circuit 322 triggering, and in the absence of either of first fault event sensing circuit 320 or second fault event sensing circuit 322 triggering indicate "no fault injection event detected."

Generally, in order to enter a normal operating mode, fault event detection circuit 300 is configured to begin in a known operating mode and then transition to the normal operating mode. In one or more examples, reset circuit 326 is arranged to place fault event detection circuit 300 in a reset mode of operation in response to an assertion of reset signal 302, and transition fault event detection circuit 300 from a reset mode of operation to a normal mode of operation in response to a de-assertion of reset signal 302. In one or more examples, assertion of reset signal 302 may also be utilized (e.g., by processor 114, without limitation) to initialize a fault event detector or clear a fault injection indication. Once cleared, a fault event indication corresponding to a subsequent detected fault injection events may be indicated by fault event detection circuit 300.

In response to an assertion of reset signal 302 (e.g., by processor 114, without limitation), reset circuit 326 is arranged to set first signal 306 to a logic high. Setting the first signal 306 to a logic high sets the fault event indication signal 308 to a logic low, via optional third inverter 304, that indicates "no fault injection event detected," for initializing or resetting bistable circuit 330 and fault event detection circuit 300 more generally. In the specific example depicted by FIG. 3, reset signal 302, is considered asserted active low (a logic low) and de-asserted passive high (a logic high), but utilization of other conventions does not exceed the scope of this disclosure.

In the case of a reset mode of operation, when reset signal 302 is asserted at reset circuit 326 (set to logic low) the PMOS switch MP0 turns ON and applies voltage Vdd to first node 318 (e.g., first node 318 is pulled up to Vdd (logic high) when reset signal 302 is asserted at reset circuit 326, without limitation) and thereby applies Vdd at respective inputs of first inverter 310 and optional third inverter 304, whose inputs are electrically coupled to first node 318. Optional third inverter 304, first inverter 310, and second inverter 316 are configured to provide an output voltage that corresponds to a logical opposite (i.e., an inverted version of the voltage) of a voltage at its input. When first signal 306 is set to logic high, here Vdd, optional third inverter 304 provides a voltage at its output that corresponds to logic low, here, GND, and thereby sets fault event indication signal 308 to a logic low, which in this specific non-limiting example corresponds to "no fault injection event detected."

First inverter 310 and second inverter 316 are arranged in series, so when first signal 306 set to logic high is received at the input of first inverter 310 the second inverter 316 sets a third signal 314, i.e., the output of second inverter 316, to logic high. Resistive circuit 312 is arranged to be always active during operation of fault event detection circuit 300 as long as Vdd and GND are supplied, as depicted, and so acts as a series resistor and sets first signal 306 to logic high when third signal 314 is logic high. In this manner, first inverter 310, second inverter 316, and resistive circuit 312 are arranged to provide a feedback path that acts as a latch, holding the state (logic high) of first signal 306.

In response to a change from an asserted to de-asserted reset signal 302 (i.e., a logic high), an operational mode of fault event detection circuit 300 changes from a reset mode of operation to a normal mode of operation in which it may detect a fault injection event. In the case of a normal mode of operation, reset circuit 326 PMOS switch MP0 is OFF in response to a de-asserted reset signal 302. When fault event detection circuit 300 is in a normal mode of operation, first signal 306 remains logic high due to the latch configuration of bistable circuit 330.

By way of non-limiting example of a contemplated operation of fault event detection circuit 300, when a fault injection event is present within a surrounding area of fault event detection circuit 300 while fault event detection circuit 300 is in a normal mode of operation, one or both of first fault event sensing circuit 320 and second fault event sensing circuit 322 detects the fault injection event and attempts to trigger a state change at bistable circuit 330.

In the case of second fault event sensing circuit 322, PMOS transistor MP1 is always OFF when a voltage Vdd applied to its gate and source terminals (e.g., during normal operation of fault event detection circuit 300, without limitation). The presence of a fault injection event within a surrounding area of fault event detection circuit 300 induces a parasitic current in PMOS transistor MP1 from voltage Vdd to second node 324 that, if sufficient to overcome the pull-down of the output of first inverter 310, forces second node 324 to voltage Vdd, changing the state of second signal 328 from a logic low to a logic high.

In one or more examples, a size of a transistor of first inverter 310 may be chosen to limit a magnitude of a pulldown current flowing via first inverter 310, where an upper limit on a magnitude of the pulldown current is directly proportional to a size of a transistor. In one or more examples, a size of PMOS transistor MP1 (and NMOS transistor MN0) may be chosen according to a desired sensitivity of second fault event sensing circuit 322 (and first fault event sensing circuit 320), a magnitude of an induced parasitic current flowing at PMOS transistor MP1 is directly proportional to a size of PMOS transistor MP1. In one or more examples, relative sizes of PMOS transistor MP1 and a transistor of first inverter 310 may be chosen to tune to a desired sensitivity of first fault event sensing circuit 320.

Responsive to the change of state of second signal 328 to logic high, second inverter 316 changes the state of third signal 314 to logic low, which is then latched in the changed state by the feedback of first inverter 310. Responsive to change of state of third signal 314 to logic low, first signal 306 changes its state to logic low, and optional third inverter 304 sets fault event indication signal 308 to a logic high, i.e., to a "fault event detected" state. The parasitic current in PMOS transistor MP1 from voltage Vdd to second node 324 may be momentary, as long as it is of sufficient duration to change the state of the first signal 306 to logic low, i.e., to propagate the logic signal through both inverters (first inverter 310 and second inverter 316) and latch the first signal 306. As a non-limiting example, a 1 nanosecond wide pulse (i.e., change in state of third signal 314) should be sufficient to set fault event indication signal 308.

In the case of first fault event sensing circuit 320, NMOS transistor MN0 is always OFF when a ground voltage GND is applied to its gate and drain terminals (e.g., during normal operation of fault event detection circuit 300, without limitation). The presence of a fault injection event within a surrounding area of fault event detection circuit 300 induces a parasitic current in NMOS transistor MN0 of first fault event sensing circuit 320 from first node 318 to ground supply GND, thereby pulling first node 318 to ground voltage GND and forcing first signal 306 to change state from a logic high to a logic low. When a first signal 306 set to logic low is received at the input of optional third inverter 304, optional third inverter 304 sets the fault event indication signal 308 to a logic high, which in this specific non-limiting example corresponds to "fault injection event detected." When first signal 306 that is set to logic low is received at the input of first inverter 310, second signal 328 is set to logic high, which sets third signal 314 to logic low through second inverter 316, thus latching the condition of first signal 306 to the logic low state, irrespective of the operation of first fault event sensing circuit 320. The parasitic current in NMOS transistor MN0 may be momentary, as long as it is of sufficient duration to change the state of the third signal 314 to logic low.

In one or more examples, fault event detection circuit 300 may include more or fewer fault event sensing circuits than depicted by FIG. 3. In the specific non-limiting example depicted by FIG. 3, fault event detection circuit 300 includes two fault event sensing circuits, first fault event sensing circuit 320 and second fault event sensing circuit 322 arranged to perform complimentary fault even sensing, which is including two or more fault event sensing circuits such as first and second fault event sensing circuits 320 and 322 that both can detect the presence of a fault injection event and influence generation of a "fault injection event detected" indication. Complimentary fault event sensing circuits (e.g., including two or more fault event sensing circuits such as first and second fault event sensing circuits 320 and 322 that both can detect fault injection events and influence generation of a "fault injection event detected" indication) may increase effectiveness (e.g., reduces false negatives, without limitation) of fault event detection circuit 300.

This disclosure is not limited to a specific number of fault event sensors. As a non-limiting example, it is specifically contemplated that a disclosed fault event detector may utilize multiple fault event sensors that are expected to, alone, be insufficient to reliably detect a presence of a fault injection event but that are expected to, as a group, reliably detect a presence of a fault injection event. As a further non-limiting example, it is specifically contemplated that a disclosed fault event detector may utilize multiple fault event sensors that are expected to, alone, be sufficient to reliably detect a presence of a fault injection event for redundancy.

A person having ordinary skill in the art will appreciate that a number of fault event sensing circuits and fault event sensors more generally is a matter of design choice. As a non-limiting example, it is specifically contemplated that a number of fault event sensors may be chosen to set a desired degree of sensitivity to the presence of a fault injection event.

A person having ordinary skill in the art will appreciate that examples of fault event detectors and fault event detection discussed herein provide many benefits and advantages. Various examples of fault event detectors may include certain characteristics that resemble a standard cell for a digital logic block. As a non-limiting example, fault event detection circuit 300 may be modified from a standard cell for a data latch. A data latch is a digital logic block commonly utilized in chips. Accordingly, an attacker may find it difficult, if not impossible, to discern a fault event detector that includes fault event detection circuit 300 (or includes another fault detection circuit modified from a standard cell) from standard cell digital logic, and will not avoid such fault detectors when attempting to induce a fault at a chip, such as when scanning a laser across the chip, without limitation. Disclosed fault event detection circuits are not limited to a specific design or manufacturing technique, such as modifying a digital logic circuit of a standard cell, and utilization of other techniques does not exceed the scope of this disclosure.

Figure 4:
FIG. 4 is a flow diagram depicting a process in accordance with one or more examples.

FIG. 4 is a flowchart depicting a process 400 for controlling operation of a fault event detector, in accordance with one or more examples. Process 400 may be performed, as a non-limiting example, by processor 114 of FIG. 1.

At operation 402, process 400 first asserts a reset signal (e.g., reset 210 or 302, without limitation) to set an operational mode a fault event detector (e.g., a first fault event detector 106, a second fault event detector 112, a fault event detector 200 (separately referred to as 200a or 200b), or a fault event detection circuit 300, without limitation) to a reset mode of operation. Setting an operational mode of a fault event detector to a reset mode of operation, sets a state of a bistable device (e.g., a bistable device 202 or a bistable circuit 330, without limitation) of the fault event detector to a first state. Optionally, operation 402 clears an asserted fault event indication, i.e., in the case that during operation the presence of a fault injection event was detected, and fault event indication signal 308 was set to a logic high, process 400 asserts the reset signal to set the state of a digital circuit of the fault event detector back to the first state, thus resetting the fault event indication signal 308 to a logic low.

At operation 404, process 400 de-asserts the reset signal to change the operational mode of the fault event detector from a reset mode of operation to a normal mode of operation. Notably, the state of the bistable device of the fault event detector stays in the first state.

At operation 406, process 400 receives an asserted fault event indication from the fault event detector. The asserted fault event indication may be indicative of a detected fault injection event in a surrounding area of the fault event sensor.

At operation 408, process 400 takes appropriate action in response to the asserted fault event indication. In one or more examples, the appropriate action taken by process 400 may be based, at least in part, on the vulnerable circuit elements in the surrounding area of the fault event detector. As a non-limiting example, process 400 may re-perform one or more operations that involved the vulnerable circuit elements in the surrounding area of the fault event detector. As another non-limiting example, process 400 may lockdown a chip because the vulnerable circuit elements affect a core process of the chip. As another non-limiting example, process 400 may trigger an alarm for a higher level process based on, at least in part, on the vulnerable circuit elements in the surrounding area of the fault event detector.

At operation 410, process 400 second asserts the reset signal to set the operational mode of the fault event detector to the reset mode of operation and, thereby, clears the asserted fault event indication. De-asserting the reset signal after second asserting the reset signal in operation 410 changes the operational mode of the fault event detector to the normal mode of operation. Accordingly, in one or more examples, toggling the reset signal (asserting and then de-asserting the reset signal) operates to reset the fault event detector and the fault event indication.

Figure 5:
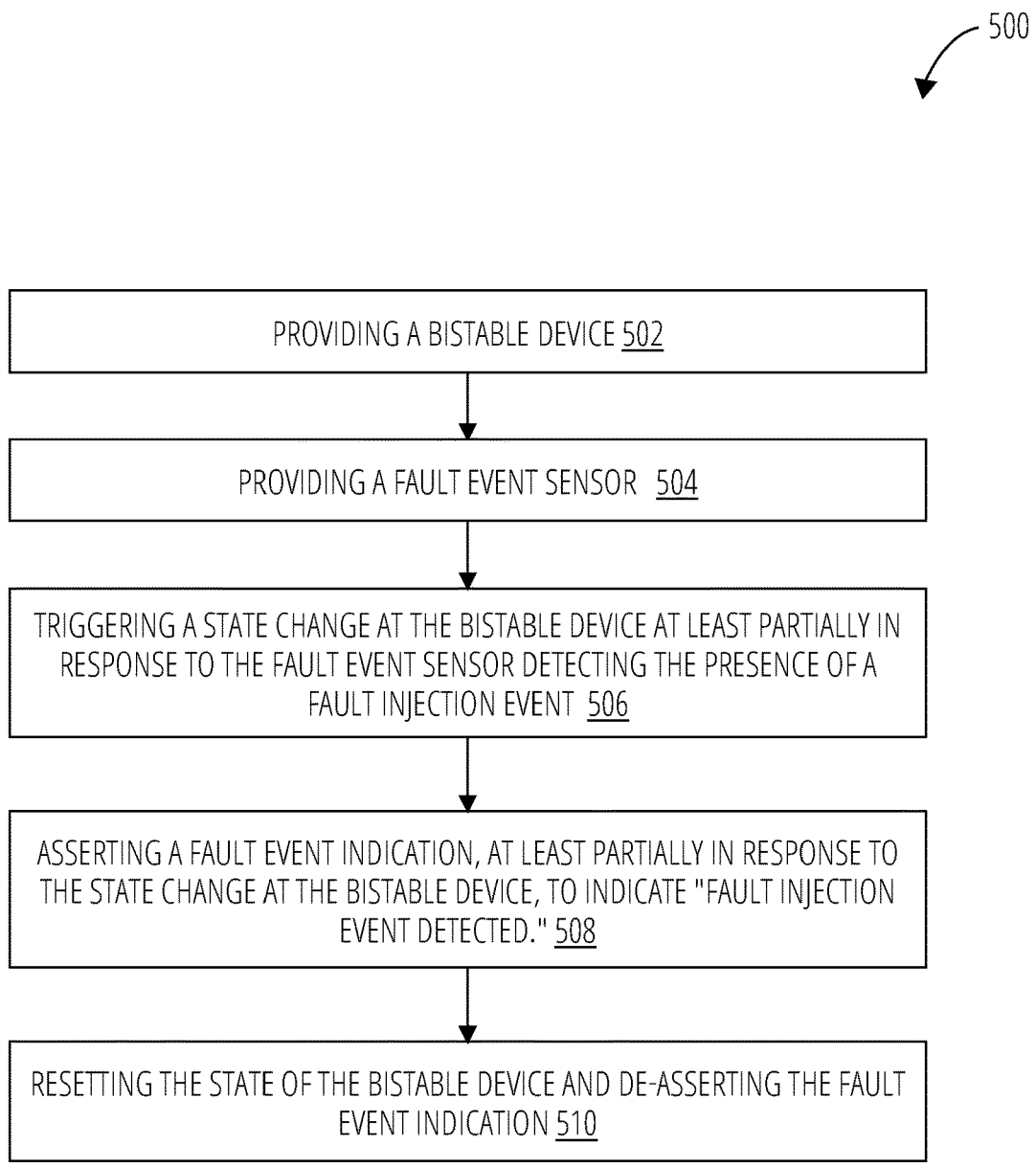
FIG. 5 is a flow diagram depicting a process in accordance with one or more examples.

FIG. 5 is a flow diagram depicting a process 500 for detecting a fault injection event by a fault event detector, in accordance with one or more examples.

At operation 502, process 500 provides a bistable device (e.g., a bistable device 202 or a bistable circuit 330, without limitation).

At operation 504, process 500 provides a fault event sensor (e.g., a fault event sensor 226 or a first fault event sensing circuit 320, or a second fault event sensing circuit 322, without limitation). In one or more examples, the fault event sensor may be configured to detect a presence of a fault injection event at least partially responsive to the presence of a fault injection event (e.g., a first fault event sensing circuit 320 including an NMOS switch MN0, or a second fault event sensing circuit 322 including a PMOS switch MP1, where the switches are arranged to be always OFF and parasitic devices thereof conduct in response to the presence of a fault injection event, without limitation).

At operation 506, process 500 triggers a state change (e.g., forcing a state of first signal 306 to change from a first state to a second state by first fault event sensing circuit 320 or second fault event sensing circuit 322, without limitation) at the provided bistable device at least partially in response to the fault event sensor detecting (e.g., turning ON conduction or increasing conduction by a parasitic device of the NMOS switch MN0 of the first fault event sensing circuit 320 or turning ON conduction or increasing conduction by a parasitic device of the PMOS switch MP1 of the second fault event sensing circuit 322, without limitation) the presence of a fault injection event.

At operation 508, process 500 asserts a state indication (e.g., first fault event indication 116, second fault event indication 118, fault event indication 208, or fault event indication signal 308 of FIG. 3, without limitation), at least partially in response to the state change at the bistable device, to indicate a "fault injection event detected."

At operation 510, process 500 resets the state of the provided bistable device, and de-asserts the fault event indication.

Figure 6:
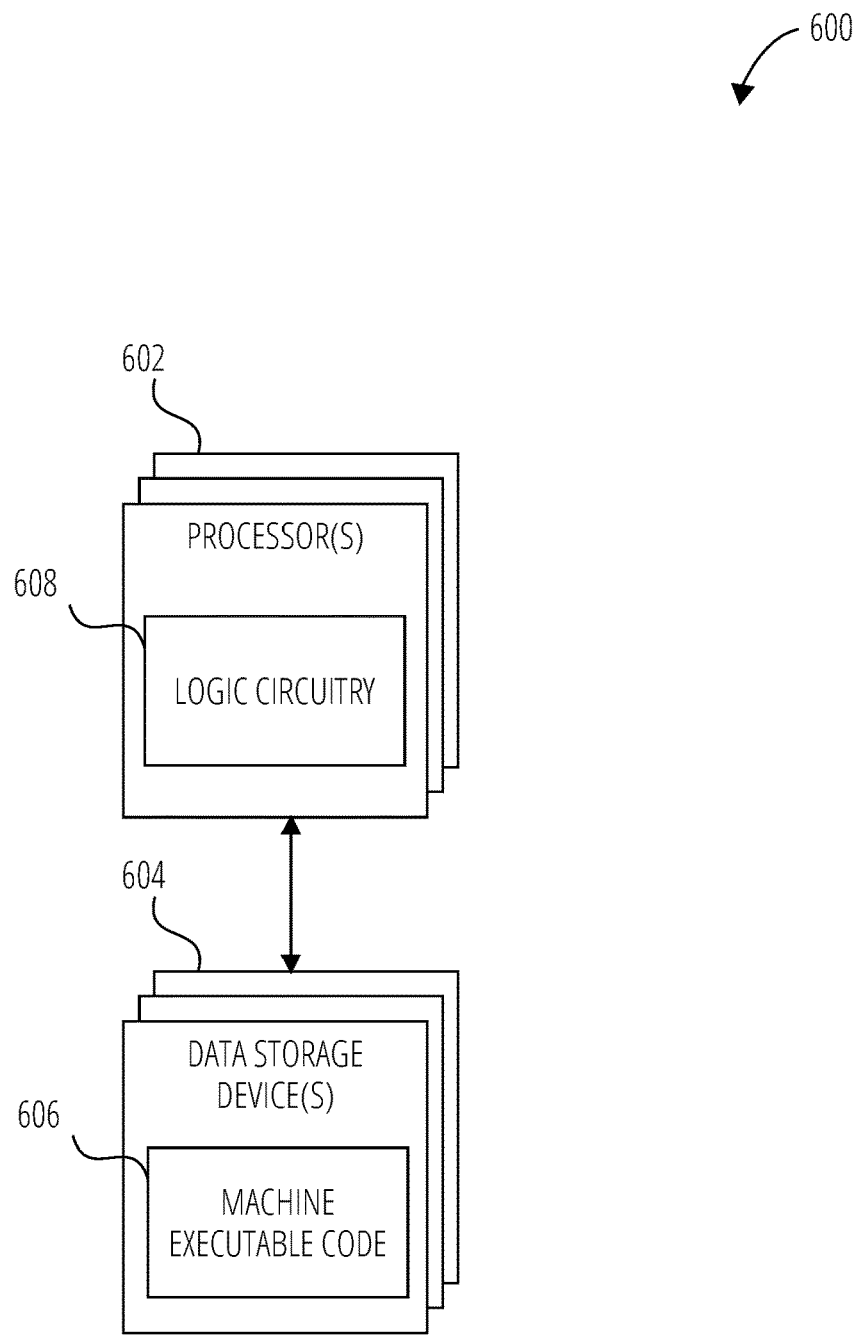
FIG. 6 is a circuit that may be configured in accordance with one or more examples.

FIG. 6 is a block diagram of an example device 600 that, in various examples, may be used to implement various functions, operations, acts, processes, and/or methods disclosed herein. Device 600 includes one or more processors 602 (sometimes referred to herein as "processors 602") operably coupled to one or more apparatuses such as data storage devices (sometimes referred to herein as "storage 604"), without limitation. Storage 604 includes machine-executable code 606 stored thereon (e.g., stored on a computer-readable memory) and processors 602 include logic circuitry 608. Machine-executable code 606 include information describing functional elements that may be implemented by (e.g., performed by) logic circuitry 608. Logic circuitry 608 is modified to implement (e.g., perform) the functional elements described by machine-executable code 606. Device 600, when executing the functional elements described by machine-executable code 606, should be considered as special purpose hardware configured for carrying out functional elements disclosed herein. In various examples, processors 602 may be configured to perform the functional elements described by machine-executable code 606 sequentially, concurrently (e.g., on one or more different hardware platforms), or in one or more parallel process streams.

When implemented by logic circuitry 608 of processors 602, machine-executable code 606 is configured to adapt processors 602 to perform operations of examples disclosed herein. For example, machine-executable code 606 may be configured to adapt processors 602 to perform at least a portion or a totality of process 400 of FIG. 4. As another example, machine-executable code 606 may be configured to adapt processors 602 to perform at least a portion or a totality of the operations discussed for chip portion 100 of FIG. 1, and more specifically, the operations discussed with regard to processor 114.

Processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to examples of the present disclosure. It is noted that a general-purpose processor (may also be referred to herein as a host processor or simply a host) may be a microprocessor, but in the alternative, processors 602 may include any conventional processor, controller, microcontroller, or state machine. Processors 602 may also be implemented as a combination of computing devices, such as a combination of a DSP and a microprocessor, a plurality of microprocessors, one or more microprocessors in conjunction with a DSP core, or any other such configuration.

In various examples, storage 604 includes volatile data storage (e.g., random-access memory (RAM)), non-volatile data storage (e.g., Flash memory, a hard disc drive, a solid state drive, erasable programmable read-only memory (EPROM), electrical erasable programmable read-only memory (EEPROM), without limitation). In various examples, processors 602 and storage 604 may be implemented into a single device (e.g., a semiconductor device product, a system on chip (SOC), without limitation). In various examples, the processors 602 and the storage 604 may be implemented into separate devices.

In various examples, machine-executable code 606 may include computer-readable instructions (e.g., software code, firmware code). By way of non-limiting example, the computer-readable instructions may be stored by storage 604, accessed directly by processors 602, and executed by processors 602 using at least logic circuitry 608. Also by way of non-limiting example, the computer-readable instructions may be stored on storage 604, transmitted to a memory device (not shown) for execution, and executed by processors 602 using at least logic circuitry 608. Accordingly, in various examples a logic circuitry 608 includes electrically configurable logic circuitry.

In various examples, machine-executable code 606 may describe hardware (e.g., circuitry) to be implemented in logic circuitry 608 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog, System Verilog or very large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples a machine-executable code 606 may include an HDL, an RTL, a GL description, a mask level description, other hardware description, or any combination thereof.

In examples where machine-executable code 606 includes a hardware description (at any level of abstraction), a system (not shown, but including storage 604) may be configured to implement the hardware description described by machine-executable code 606. By way of non-limiting example, processors 602 may include a programmable logic device (e.g., an FPGA or a PLC, without limitation) and logic circuitry 608 may be electrically controlled to implement circuitry corresponding to the hardware description into logic circuitry 608. Also by way of non-limiting example, logic circuitry 608 may include hard-wired logic manufactured by a manufacturing system (not shown, but including storage 604) according to the hardware description of machine-executable code 606.

Regardless of whether machine-executable code 606 includes computer-readable instructions or a hardware description, logic circuitry 608 is modified to perform the functional elements described by machine-executable code 606 when implementing the functional elements of machine-executable code 606. It is noted that although a hardware description may not directly describe functional elements, a hardware description indirectly describes functional elements that the hardware elements described by the hardware description are capable of performing.

As an example, machine-executable code 606 may be configured to adapt processors 602 or logic circuitry 608 thereof to perform at least a portion or a totality of the operations discussed for: first fault event detector 106 or second fault event detector 112 of FIG. 1; for fault event detector 200a of FIG. 2A, and more specifically, the operations discussed with regard to bistable device 202, and fault indicator 206; fault event detection circuit 300 of FIG. 3, and more specifically, reset circuit 326, first fault event sensing circuit 320, second fault event sensing circuit 322, and bistable circuit 330. As another non-limiting example, machine-executable code 606 may be configured to adapt processors 602 or logic circuitry 608 thereof to perform at least a portion or a totality of the operations discussed for process 500.

A person having ordinary skill in the art will appreciate that at least one advantage of disclosed fault injection event detection and chips implementing the same is the flexibility afforded a designer to choose a variety of suitable arrangements optionally utilizing standard cell circuits.

Any characterization in this description of something as "typical," "conventional," "known," or the like, does not necessarily mean that it is disclosed in the prior art or that the discussed aspects are appreciated in the prior art. Nor does it necessarily mean that, in the relevant field, it is widely known, well-understood, or routinely used. It only means that it is known to or appreciated by the inventors of this disclosure.

As used in the present disclosure, the term "combination" with reference to a plurality of elements may include a combination of all the elements or any of various different sub combinations of some of the elements. For example, the phrase "A, B, C, D, or combinations thereof" may refer to any one of A, B, C, or D; the combination of each of A, B, C, and D; and any sub combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations. As used herein, the term "each" means some or a totality, and the term "each and every" means a totality.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: a chip portion, comprising: a first fault event detector comprising a first bistable device that changes state in response to a presence of a fault injection event within a first surrounding area of the first fault event detector; and a first vulnerable digital circuit, wherein at least a portion of the first vulnerable digital circuit is located within the first surrounding area.

Example 2: the chip portion according to Example 1, wherein the first fault event detector is configured to assert a first fault event indication at least partially responsive to a changing state of the first bistable device.

Example 3: the chip portion according to any of Examples 1 and 2, comprising a processor, wherein the processor is configured to take an appropriate action at least partially responsive to the asserted first fault event indication.

Example 4: the chip portion according to any of Examples 1 through 3, comprising: a second fault event detector comprising a second bistable device that changes state in response to a presence of a second fault injection event within a second surrounding area; and a second vulnerable digital circuit, wherein at least a portion of the second vulnerable digital circuit is located within the second surrounding area.

Example 5: the chip portion according to any of Examples 1 through 4, comprising one or more other vulnerable digital circuits arranged within the first surrounding area.

Example 6: the chip portion according to any of Examples 1 through 5, wherein the first fault event detector comprises a fault event sensor configured to detect the presence of the fault injection event within the first surrounding area of the first fault event detector.

Example 7: the chip portion according to any of Examples 1 through 6, wherein the fault event sensor is arranged to trigger the state change of the first bistable device at least partially responsive to the detected presence of the fault injection event within the first surrounding area of the first fault event detector.

Example 8: the chip portion according to any of Examples 1 through 7, wherein the fault event sensor is a fault event sensing circuit that includes a PMOS transistor arranged to be always OFF and arranged as a pull-up transistor.

Example 9: the chip portion according to any of Examples 1 through 8, wherein the fault event sensor is a fault event sensing circuit that includes an NMOS transistor arranged to be always OFF and arranged as a pull-down transistor.

Example 10: the chip portion according to any of Examples 1 through 9, wherein the first fault event detector comprises a resistive circuit arranged to assist the fault event sensing circuit to trigger the state change of the first bistable device.

Example 11: the chip portion according to any of Examples 1 through 10, wherein the first fault event detector comprises two fault event sensors each configured to detect the presence of the fault injection event within the first surrounding area of the first fault event detector.

Example 12: the chip portion according to any of Examples 1 through 11, wherein the first fault event detector comprises a reset circuit arranged to set an operational mode of the first fault event detector in response to assertions and de-assertions of a reset signal.

Example 13: a method, comprising: first asserting a reset signal to set an operational mode of a fault event detector to a reset mode of operation; de-asserting the reset signal to change the operational mode of the fault event detector from a reset mode of operation to a normal mode of operation; receiving an asserted fault event indication from the fault event detector; taking an appropriate action at least partially responsive to the asserted fault event indication; and toggling the reset signal to reset the fault event detector and clear the asserted fault event indication.

Example 14: the method according to Example 13, wherein the taking the appropriate action comprises re-performing one or more operations.

Example 15: the method according to any of Examples 13 and 14, wherein the taking the appropriate action comprises locking down a chip.

Example 16: the method according to any of Examples 13 through 15, wherein the taking the appropriate action comprises triggering an alarm.

Example 17: the method according to any of Examples 13 through 16, comprising taking the appropriate action at least partially responsive to a vulnerable digital circuit in a surrounding area of the fault event detector.

Example 18: a method, comprising: providing a bistable device; providing a fault event sensor; triggering a state change at the bistable device at least partially responsive to the fault event sensor detecting a presence of a fault injection event; asserting a fault event indication at least partially responsive to the state change at an internal signal of a first circuit; and resetting the changed state of the bistable device and de-asserting the fault event indication.

Example 19: a computing system, comprising: a processor; and a memory storage having thereon machine-executable code modified to permanently configure logic circuit of the processor to include: a first fault event detector, the first fault event detector comprising a first bistable device that changes state in response to a presence of a fault injection event within a first surrounding area of the first fault event detector; and a first vulnerable digital circuit, wherein at least a portion of the first vulnerable digital circuit is located within the first surrounding area.

Example 20: a computing system, comprising: a processor; and a memory storage having thereon machine-executable code modified to permanently configure logic circuit of the processor to: first assert a reset signal to set an operational mode of a fault event detector to a reset mode of operation; de-assert the reset signal to change the operational mode of the fault event detector from a reset mode of operation to a normal mode of operation; receive an asserted fault event indication from the fault event detector; take an appropriate action at least partially responsive to the asserted fault event indication; and toggle the reset signal to reset the fault event detector and clear the asserted fault event indication.

Example 21: a computing system, comprising: a processor; and a memory storage having thereon machine-executable code modified to permanently configure logic circuit of the processor to: provide a bistable device; provide a fault event sensor; trigger a state change at the bistable device at least partially responsive to the fault event sensor detecting a presence of a fault injection event; assert a fault event indication at least partially responsive to the state change at an internal signal of a first circuit; and reset the changed state of the bistable device and de-assert the fault event indication.

Example 22: an apparatus, comprising: a detector, wherein a signal the detector is configured to sense is a parasitic current at a CMOS structure that exhibits a generally increasing magnitude in response to a presence of a fault injection event.

Example 23: the apparatus according to Example 22, comprising: a digital circuit susceptible to the presence of the fault injection event.

Example 24: the apparatus according to any of Examples 22 and 23, wherein the digital circuit is arranged within a surrounding area of the detector.

The features of the various examples described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the claims which follow, and legal equivalents thereof.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   a first fault event detector comprising a first bistable device that changes state in response to a presence of a fault injection event within a first surrounding area of the first fault event detector, wherein the first fault event detector comprises:
      an NMOS transistor to selectively pull-down a voltage at a first internal node of the bistable device to a first voltage level utilized to represent a first logic level,
      a PMOS transistor to selectively pull-up the voltage at a second internal node of the bistable device to a second voltage level utilized to represent a second logic level,
      an inverter having an input coupled with the first internal node and an output coupled with the second internal node; and
      a further inverter having an input coupled with the second internal node and an output coupled with the first internal node via a resistive circuit, wherein the resistive circuit to set a responsiveness of the first internal node to changes in voltage level at the output of the further inverter; and
   a first vulnerable digital circuit, wherein at least a portion of the first vulnerable digital circuit is located within the first surrounding area.

2. The apparatus of claim 1, wherein the first fault event detector to assert a first fault event indication responsive to a changing state of the first bistable device.

3. The chip apparatus of claim 2, comprising a processor, wherein the processor to take an appropriate action responsive to the asserted first fault event indication.

4. The apparatus of claim 1, comprising:
   a second fault event detector comprising a second bistable device that changes state in response to a presence of a second fault injection event within a second surrounding area; and
   a second vulnerable digital circuit, wherein at least a portion of the second vulnerable digital circuit is located within the second surrounding area.

5. The apparatus of claim 1, comprising one or more other vulnerable digital circuits arranged within the first surrounding area.

6. The apparatus of claim 1, wherein the PMOS transistor and NMOS transistor of the first fault event detector comprises a fault event sensor to detect the presence of the fault injection event within the first surrounding area of the first fault event detector.

7. The chip apparatus of claim 6, wherein the fault event sensor is arranged to trigger the state change of the first bistable device responsive to the detected presence of the fault injection event within the first surrounding area of the first fault event detector.

8. The apparatus of claim 6, wherein the PMOS transistor is arranged to be always OFF.

9. The apparatus of claim 6, wherein the NMOS transistor is arranged to be always OFF.

10. The apparatus of claim 1, wherein the first fault event detector comprises two fault event sensors, one of which includes the first bistable device, and each of the two fault event sensors configured to detect the presence of the fault injection event within the first surrounding area of the first fault event detector.

11. The apparatus of claim 1, wherein the first fault event detector comprises a reset circuit arranged to set an operational mode of the first fault event detector in response to assertions and de-assertions of a reset signal.

12. The chip portion of claim 1, wherein the fault event detector and the vulnerable digital circuit are respectively located in a same chip portion.

13. The apparatus of claim 1, wherein the first bistable device comprises: the inverter, the first internal node, the second internal node, the resistive circuit, and the further inverter.

14. A method, comprising:
   first asserting a reset signal to set an operational mode of a fault event detector to a reset mode of operation;
   de-asserting the reset signal to change the operational mode of the fault event detector from a reset mode of operation to a normal mode of operation;
   receiving an asserted fault event indication from the fault event detector;
   taking an appropriate action responsive to the asserted fault event indication; and
   toggling the reset signal to reset the fault event detector and clear the asserted fault event indication, wherein the first fault event detector comprises:
an NMOS transistor to selectively pull-down a voltage at a first internal node of the bistable device to a first voltage level utilized to represent a first logic level;
a first PMOS transistor to selective pull-up the voltage at the first internal node of the bistable device to a second voltage level utilized to represent a second logic level;
a second PMOS transistor to selectively pull-up the voltage at a second internal node of the bistable device to the second voltage level utilized to represent the second logic level;
an inverter having an input coupled with the first internal node and an output coupled with the second internal node; and
a further inverter having an input coupled with second internal node and an output coupled with the first internal node via a resistive circuit, wherein the resistive circuit to set a responsiveness of the first internal node to changes in voltage level at the output of the further inverter.

15. The method of claim 14, wherein the taking the appropriate action comprises re-performing one or more operations.

16. The method of claim 14, wherein the taking the appropriate action comprises locking down a chip.

17. The method of claim 14, wherein the taking the appropriate action comprises triggering an alarm.

18. The method of claim 14, comprising taking the appropriate action at least partially responsive to a vulnerable digital circuit in a surrounding area of the fault event detector.

19. A computing system, comprising:
a processor; and
a memory storage having thereon machine-executable code modified to permanently configure logic circuit of the processor to include:
a fault event detector, the fault event detector comprising a first bistable device that changes state in response to a presence of a fault injection event within a first surrounding area of the fault event detector, wherein the fault event detector comprises:
an NMOS transistor to selectively pull-down a voltage at a first internal node of the bistable device to a first voltage level utilized to represent a first logic level;
a PMOS transistor to selectively null-up the voltage at a second internal node of the bistable device to a second voltage level utilized to represent a second logic level;
an inverter having an input coupled with the first internal node and an output coupled with the second internal node;
a further inverter having an input coupled with second internal node and an output coupled with the first internal node via a resistive circuit, wherein the resistive circuit to, set a responsiveness of the first internal node to changes in voltage level at the output of the further inverter; and
a vulnerable digital circuit, wherein at least a portion of the vulnerable digital circuit is located within the first surrounding area of the fault event detector.

* * * * *

UNITED STATES PATENT AND TRADEMARK OFFICE
CERTIFICATE OF CORRECTION

| | |
|---|---|
| PATENT NO. | : 11,836,278 B2 |
| APPLICATION NO. | : 17/303326 |
| DATED | : December 5, 2023 |
| INVENTOR(S) | : Michael Klein |

Page 1 of 1

It is certified that error appears in the above-identified patent and that said Letters Patent is hereby corrected as shown below:

In the Specification
    Column 3,     Line 54,     change "format lxx and" to --format 1xx and--

In the Claims
| | | | |
|---|---|---|---|
| Claim 1, | Column 21, | Line 58, | change "first logic level," to --first logic level;-- |
| Claim 1, | Column 21, | Line 62, | change "logic level," to --logic level;-- |
| Claim 3, | Column 22, | Line 11, | change "The chip apparatus" to --The apparatus-- |
| Claim 7, | Column 22, | Line 30, | change "The chip apparatus" to --The apparatus-- |
| Claim 19, | Column 24, | Line 14, | change "selectively null-up the" to --selectively pull-up the-- |
| Claim 19, | Column 24, | Line 24, | change "circuit to, set a" to --circuit to set a-- |

Signed and Sealed this
Twenty-third Day of April, 2024

*Katherine Kelly Vidal*

Katherine Kelly Vidal
*Director of the United States Patent and Trademark Office*